United States Patent [19]
Ledjeff et al.

[11] Patent Number: 5,952,118
[45] Date of Patent: Sep. 14, 1999

[54] PEM FUEL CELL WITH STRUCTURED PLATES

[75] Inventors: Konstantin Ledjeff, Bad Krozingen; Roland Nolte, Denzlingen, both of Germany

[73] Assignee: Fraunhofer-Gesellschaft Zur Foerderung der Angewandten, Munich, Germany

[21] Appl. No.: 08/849,631

[22] PCT Filed: Dec. 5, 1995

[86] PCT No.: PCT/DE95/01751

§ 371 Date: Jan. 4, 1997

§ 102(e) Date: Jan. 4, 1997

[87] PCT Pub. No.: WO96/18217

PCT Pub. Date: Jun. 13, 1996

[30] Foreign Application Priority Data

Dec. 9, 1994 [DE] Germany .............................. 44 43 939

[51] Int. Cl.[6] ...................................................... H01M 8/10
[52] U.S. Cl. ................................ 429/32; 429/18; 429/30; 429/34; 429/38; 429/39
[58] Field of Search .................... 429/30, 32, 18, 429/38, 39, 34

[56] References Cited

U.S. PATENT DOCUMENTS

| | | | |
|---|---|---|---|
| 4,175,165 | 11/1979 | Adlhart | 429/30 |
| 4,833,045 | 5/1989 | Pollack et al. | 429/30 |
| 5,169,731 | 12/1992 | Yoshimura et al. | 429/30 |
| 5,171,646 | 12/1992 | Rohr | 429/30 |
| 5,219,673 | 6/1993 | Kaun | 429/32 |
| 5,258,240 | 11/1993 | Di Croce et al. | 429/32 |
| 5,470,671 | 11/1995 | Fletcher et al. | 429/30 |
| 5,686,197 | 11/1997 | Nishida et al. | 429/30 |

OTHER PUBLICATIONS

A.J. Apley, E.B. Yeager, Energy 11, 137–152 (1986) No month available.

*Primary Examiner*—Bruce F. Bell
*Attorney, Agent, or Firm*—Marshall & Melhorn

[57] ABSTRACT

The invention relates to a PEM fuel cell comprising at least one strip membrane (17) consisting of at least two, maximally 10,000 planar individual cells, each composed of an electrode layer (11, 16) applied on both sides of a membrane of a polymeric solid electrolyte, with the individual cells series-connected and with plates assembled on both sides to said strip membrane (17) and featuring conductive regions (20) and nonconductive regions (21), said regions being configured such that a short circuit between the individual electrodes of one membrane side is avoided.

24 Claims, 7 Drawing Sheets

FIG. 1

(PRIOR ART)

PEM FUEL CELL WITH STRUCTURED PLATES

This application is a 371 of PCT/DE95/01751 filed Dec. 5, 1995.

FIELD OF THE INVENTION

The invention relates to a PEM fuel cell consisting of strip membranes and plates assembled to both sides of the membrane, with the plates featuring conductive and nonconductive regions.

BACKGROUND OF THE INVENTION

PEM fuel cells (polymer electrolyte membrane fuel cells) are electrochemical cells consisting, simplified, of anode, cathode and interposed polymeric solid electrolytes. To operate such cells, fuels are continuously supplied externally to both electrodes, where they are electrochemically converted so that a voltage can be tapped on the electrodes. It is not possible, however, to convert the entire energy supplied. A certain part is always lost as heat in the operation of the fuel cell. Especially higher-output fuel cells require therefore measures for heat dissipation. According to the prior art, this is effected with the use of electrically conductive heat exchanger plates through which a coolant is passed (literature: A. J. Appley, E. B. Yeager, Energy 11, 137–152 [1986]).

Both sides of the membrane-electrode unit are in contact with the electrically conductive plates, with interposed gaskets being used to achieve cell tightness. The conductive plates are configured as heat exchangers, that is, they contain ducts through which flows as coolant. The coolant is introduced and drained by way of openings contained in the plate. Integrated in the electrically conductive plates are also feed and drain ducts for the fuels, with the fuels then being supplied to the electrodes via suitable structures. For such fuel cell structure according to the prior art it is necessary, however, that the plates consist of electrically conductive material, since each plate must bear down on the respective eletrode area so as to establish the outward electrical connection of the cell. In the case of a stacked design, the plates may be fashioned also as bipolar plates.

To achieve higher outputs, and especially for achieving a higher voltage, it is known also to combine several membrane-electrode units, as described above, to a so-called fuel cell stack (U.S. Pat. No. 4,175,165 "Fuel cell system utilizing ion exchange membranes and bipolar plates"). To that end, a plurality of such cells, as described above, have so far been constructed separately, arranged successively and electrically wired in series, making the voltages of the individual cells additive. The design-related expense of such a series circuit is very high, however, since each membrane-electrode unit requires a separate fuel supply. This makes for a very high engineering expense for such cells.

SUMMARY OF THE INVENTION

Basing thereon, the objective underlying the present invention is to provide a PEM fuel cell which in addition to high output voltages features a very simple and low-cost structure.

According to the invention it is thus proposed to construct a PEM fuel cell of so called strip membranes and plates in contact with them on both sides. The design of the plates is such that they possess both conductive and nonconductive regions, the arrangement of the regions being such that a short circuit between the individual electrodes of a membrane side will be avoided. Inventionally essential is thus the use of novel strip membranes and their joining to plates of a configuration such that they possess both conductive and nonconductive regions. The inventional plates serve at the same time as heat exchangers and as a fuel gas supply system. Realized thereby are PEM fuel cells with a simple structure and a high output voltage. The voltage can be boosted once again when realizing so-called fuel cell stacks by series wiring of several strip membranes structured as described above. According to the invention it is also possible to employ no individual strip membranes, so-called one dimensional strip membranes, but to arrange several such strip membranes in parallel as so-called two-dimensional strip membranes. The structure of the two-dimensional strip membranes may be such that the individual strip membranes are disposed either parallel to one another and wired in parallel by the plates according to the invention, or that the individual strip membranes are arranged in parallel successively and series-connected successively. Realized thereby is once again a voltage boost.

The strip membrane used according to the invention consists of specially wired individual cells. Possible, for one, is a series connection of the individual cells either via electronically conductive regions or by a stair-step arrangement.

For the first configuration of the strip membrane the connection is such that adjacent planar regions with different conductivity are provided.

A region is formed by the individual cell itself, and the individual cell itself, in order to guarantee ion conductance, consists of an ionically conductive material. Polymeric solid electrolytes in the form of membranes are used for that purpose. With either cations or anions required to be transported, the membrane must be permeable either to cations or anions. Ion conductivity in an aqueous environment is generally given for cation-conducting polymers in the presence of carboxylic acid groups and/or sulfonic acid groups and or phosphonic acid groups that are firmly anchored in the polymer, i.e., generally by chemical bond. For anion-conducting polymers, ion conductivity is given notably when the polymer contains amino groups, quaternary ammonium groups or pyridine groups. Ion conductivity is created with the options described so far by the existence of ions that are firmly anchored in the membrane or by swelling in water.

Examples for cation-conducting polymers of this type are sulfonated polysulfones, polyether sulfones or also polyether ketones.

The membrane thickness may range between 0.5 $\mu$m and 1 mm, preferably from 10 $\mu$m to 200 $\mu$m. The areas of the membrane for the individual cell depend on the stack output required. The areas may range from 1 $mm^2$ to 1,000,000 $mm^2$, preferably from 100 to 10,000 $mm^2$.

To enable the function as individual cell, the membranes are coated on both sides with electrode material. Since the electrochemical conversions of the cell occur on the electrodes, these may consists either themselves of the material that is electrochemically decomposed, or they may consist of a material that catalyzes the electrochemical decomposition. The material must be electronically conductive and consists specifically of metals, metal oxides, mixed oxides, alloys, carbon, electronically conductive polymers or mixtures thereof.

The materials may contain additives serving to adjust hydrophilicity or hydrophobicity, with which additives water-repellent properties can be imparted to the electrode films. Possible also are additives that allow the adjustment of a certain porosity. This is significant specifically when gaseous substances are catalytically converted on the electrodes, wherein a three-phase contact is required between gas, catalyst and ion-conductive region. Moreover, so-called binders may be admixed, which facilitate the stable and operative tie-in of the electrode with the ion-conducting region.

So stored, this individual cell is now electrically wired in series with other individual cells, with the aid of planar electronically conductive regions.

The electron-conducting regions serve to establish electron conductivity between always one electrode area of an individual cell and the electrode area of the next individual cell disposed on the other side of the membrane.

For the electronically conductive regions there are materials used which instead of the ion conductivity of the individual cell possess electron conductivity. The function of the strip membrane is independent of specific polymer materials for the electron-conducting regions as long as the materials are capable of conducting electrons. In polymeric materials, electron conductivity can be obtained by using polymers which by their molecular structure are capable of achieving electron conductivity, as is the case, e.g., with polyacetylene or polythiophenes.

Electron conductivity can be created also by admixture of a certain amount of conductive substances to a nonconducting polymer. Such conductive substances are specifically conductive soot, graphite, carbon fibers, particles or fibers of polymers that are electronically conductive themselves, metal particles, metal flakes or metal fibers or metallized substrate materials.

The polymers may contain additives that alter the swelling behavior in water. This is significant notably when the membrane is used in an aqueous environment. Ionically conductive regions of the membrane provided which charged groups swell here, which expresses itself in an alteration of the geometric measurements. Other regions that are not provided with charged chemical groups, in contrast, hardly undergo any swelling, so that mechanical tensions are created on the boundary surfaces of both films. This can be avoided by admixing to the regions provided with non-charged groups an additive that adapts the swelling behavior of both.

Inventionally essential is now that the individual cells described above are series-wired by way of the electronically conductive regions. To that end, either the bottom electrode area of a membrane of an individual cell is connected via the electronically conductive regions to the following individual cell, and at that, presently to the top electrode area. Conversely, it is just as well possible, of course, to connect the top electrode area of a first individual cell via the electronically conductive region to the bottom electrode area of the next individual cell.

The electrode-coated ionically conductive regions (corresponding to an individual cell) border in such a structure directly on the electronically conductive regions. To avoid short-circuiting at this boundary the coated top side and bottom side of the ionically conductive region by the electronically conductive regions, which means failure of the individual cell, the electrode coatings must not be applied up to the edge of the ionically conductive material. Only the top or the bottom electrode coating of an individual cell may be connected electrically conductively to the adjacent electrically conductive region. This is accomplished by coating the region between electrode coating and electronically conductive region on the one side of the ion-conducting region with electronically conductive structures, thereby enabling a definitive electrical connection of the individual membrane regions as described above. The material used for that purpose consists either of the materials included among those for the electronically conductive regions or of those for the electrode coating of the membrane.

Accomplished thereby is now a series connection of the individual cells via the electronically conductive regions. The dimensions of the electronically conductive region correspond in thickness and width approximately to those of the individual cell, so that overall a planar strip membrane is created that consists of periodically repeating regions, namely of the individual cell, for one, and of the electronically conductive regions, for another.

According to a preferred embodiment it is now proposed to arrange insulation regions between the individual cells and the electronically conductive regions. The dimensions (thickness, width) match approximately those of the individual cell, or of the conducting region.

These regions serve the electrical insulation between the differently conductive regions. Therefore, they consist of both ionically and also electronically nonconductive polymer material. The function of the strip membrane is independent of specific polymer materials for the nonconducting regions as long as the materials are neither ion-conducting nor electron-conducting. Employed, therefore, are polymer materials such that fall neither in the category of "Materials for the ion-conductive regions of the membrane units" nor in the category of "Materials for the electronically conductive regions."

In constructing the membrane with the insulation regions, as opposed to structuring without insulation regions, the electrode coatings may possess the same area as the ion-conducting membranes.

For series wiring in this embodiment of the invention, a connection to the bottom or top electrode area of the individual cells via the electronically conductive regions must then be guaranteed. This is made possible by coating the strip membrane in specific regions, and at that, on the top or bottom membrane area of the insulation region, with electronically conducting structures, enabling a definitive electric wiring of the individual membrane regions, and at that, in a manner such that an electrode area of an individual cell connects to the electrode area of the next individual cell on the other side of the membrane. The material used for that purpose consists either of the materials included in those for the electronically conductive regions or of those included in the materials for the electrode coating of the membrane.

A strip membrane which according to the preferred embodiment features additionally insulation regions is thus composed of periodically repeating regions of the individual cell, of the insulation region and the electronically conducting region. The strip membrane consists preferably of 2 to 300 individual cells.

In the embodiment with the stair-step behavior, the series connection is obtained in that the electrode area of an individual cell assumes at the same time the task of the electronically conductive region. A separate electronically conductive region is dispensable in this case, the same as are insulation regions. To guarantee in this case a series connection of two individual cells, the cells overlap in a manner such that the edge region of an electrode area of the first individual cell connects in electronically conducting manner directly to the edge region of the electrode area on the other membrane side of the next individual cell. Created in this case is a strip membrane where the various individual cells are assembled side by side with a stair-step overlap. The structure of the individual cell corresponds to the type described above.

As stated initially already, the strip membrane described above can be used now either as a so-called one-dimensional strip membrane or in the form of a so-called two-dimensional strip membrane. According to the invention, these one-dimensional or two-dimensional strip membranes serve now the structuring of corresponding fuel cells or fuel-cell stacks.

When using a one-dimensional strip membrane or a two-dimensional membrane of the type described above, the plates serve then as end plates. In the two-dimensional strip membrane with the parallel arrangement of the individual strips, the parallel connection of the individual strips to one another is effected by the end plates themselves. The electrically conductive regions are in this case of a configuration such that they establish an electrically conducting connection between only the last electrode of the relevant individual strip membranes. In the case of a fuel-cell stack, the plates act, for one, as intermediate plates and, for another, again as end plates in the manner described above.

The inventionally used end plates or intermediate plates may be constructed in various ways. For one, it is possible to use an electrically conductive basic element. In this electrically conductive basic element, a specific piece of material is then replaced on the side facing the membrane by a nonconductive material. Hence, the procedure bases on a conductive component and a nonconductive component which by means of suitable bonding techniques (e.g., gluing, welding or other comparable techniques) are durably and tightly joined to form a structured plate, e.g., an end plate. Essential is that only the first, respectively last, electrode of the strip membrane connects to the electronically conductive component.

Another option consists in using a nonconducting basic element. It contains a recess only at the spot opposite the first or last electrode of the strip membrane, in which recess a conductive structure is placed and tightly and durable joined to the nonconducting basic element, using suitable bonding techniques as described above. The external electrical bonding can be established either by piercing the basic element at the recessed spot and passing the conductive structure from the side near the membrane to the other side of the basic element (and bonding there) or by extending the recess without piercing up to the edge of the basic element and giving the inserted conductive structure this same length, so that the bonding can then be effected there on the edge.

As an alternative to the two options for manufacturing the inventional plates as described above, also a coating of the respective basic elements may be employed. Of course, the coating is applied on the side of the basic element facing the membrane. Coated is the entire area, except for the region opposing the first or last electrode of the strip membrane. Such coatings can be obtained, e.g., using thin-film technologies such as plasma polymerization of organic compounds or MOPECVD methods (metal organyl plasma-enhanced chemical vapor deposition), or by spray application and drying of non-conducting polymer solutions. Proceeding conversely is possible as well, of course. Thereafter, an electronically nonconducting basic element is used and provided with an appropriate electronically conducting coating, creating in the case of intermediate plates a conductive connection between the conductive regions of both plate sides, and the conductive coating allowing in the case of end plates an external bonding for voltage tapping.

Usable preferred materials for the electronically conductive regions of the structured plates are specifically graphite, metals, metal mixtures, alloys or electronically conductive polymers. The latter include, for one, the intrinsically conductive polymers, such as polyacetylene, or nonconducting polymers provided with electrically conductive additives. Suitable additives are especially powders, granulates, fiber shreds, fibers, netting or matting of metals, metal mixtures, alloys, graphite fibers of carbon fibers. The materials must specifically withstand the operating conditions in a PEM fuel cell, that is, contact with the fuels, water, also at temperatures above room temperature (typically 70 to 90° C.), and they must be stable electrochemically.

Suitable preferred materials for the electronically nonconductive regions of the structured plates are nonconducting ceramics, oxidic compounds and particularly plastics, notably oxidation- and hydrolysis-stable construction polymers, such as polymers with aromatic backbone, for example, polysulfones or polyether ketones.

The end plates/bipolar plates contain typically structures that allow the supply of fuel to the membrane and allow fuel removal, and they safeguard that fuel will be fed to all electrodes of the strip membrane. The fuel supply structure known from the prior art can be transferred, in principle, to the structured end plates and structured bipolar plates. This structure consists typically of a duct for the fuel removal and a duct for the fuel supply. Opposite the electrode of the strip membrane, the end plate contains distribution structures which, for one, bear down on the membrane and, for another, comprise cavities for feeding gas to the membrane electrodes. These cavities may be, e.g., parallel ducts or such arranged in a checkerboard pattern or porous structures. The structures connect to the fuel supply ducts and fuel removal ducts, enabling a fuel flow from the feed duct via the distribution structure to the removal duct.

In the case of stack design, the feed and drain ducts empty in supply ducts that extend though the entire stack. Each bipolar plate contains the appropriate bores, and stacking several plates with such bores forms then the described supply ducts.

The great advantage of this design with strip membranes is constituted by the fact that only one fuel supply structure is needed for all cell units present on one strip membrane.

Since fuel cells of necessity involve dissipation in their operation under electric load, a cell structure must include options for removal of surplus heat in order to prevent over-heating of the fuel cell.

The structured end plates/bipolar plates may for that purpose contain ducts or cavities through which flows an appropriate coolant, for example water, that proceeds through appropriate feed and drain ducts.

In the case of stacked design, the feed and drain ducts empty in supply ducts extending through the entire stack. Each bipolar plate contains the appropriate bores, and stacking several plates with such bores forms then the described supply ducts.

As described above, the bipolar plate may consist also of two end plates assembled to one another with their faces. The cooling structures may in this case consist also of recesses in both faces, with the cooling ducts forming then upon assembly of both plates. Another option consists in fitting additionally an electronically conductive cooling element between the end plates forming the bipolar plate.

Th advantage of this strip membrane design is that only one cooling structure is needed for all cell units contained on a strip membrane.

The individual cell components, that is, the plates and the strip membrane, are facultatively pressed on one another by means of gaskets so as to ensure fuel tightness of the entire cell structure. The gaskets are preferably inserted between strip membrane and plates. The overall structure may be formed, e.g., of individual areas which are then durably joined by means of gluing or welding techniques.

BRIEF DESCRIPTION OF THE DRAWINGS

Further features, details and advantages of the invention derive with the aid of the drawings, which show in.

DETAILED DESCRIPTION OF THE PREFERRED EMBODIMENT

Figure 1:
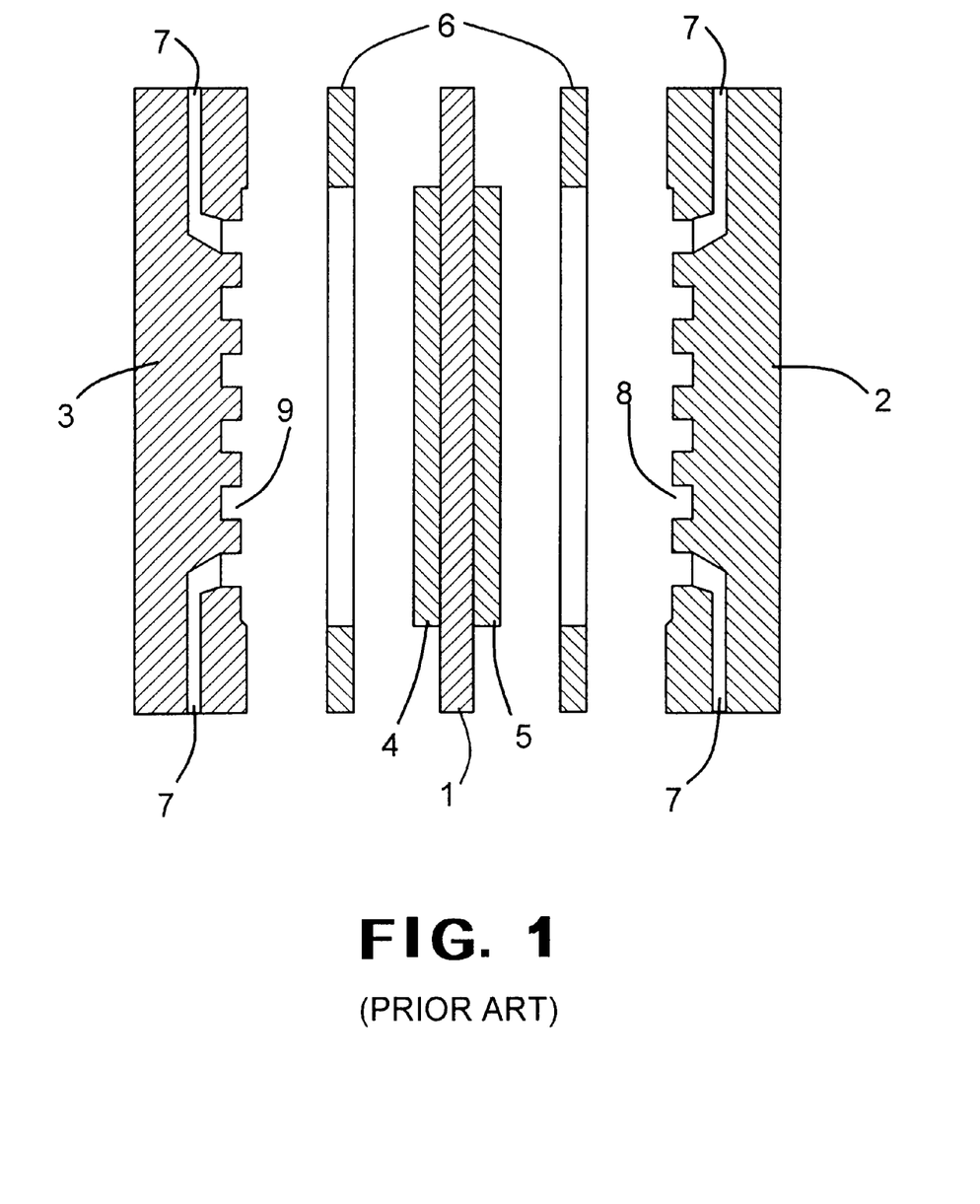
FIG. 1, in vertical section, the major components of a PEM fuel cell according to the prior art.

FIG. 1 shows the major components for construction of a fuel cell according to the prior art. These cells (e.g., A. J. Appley, E. B. Yeager, Energy 11, 137–152; 1986) consist of two end plates 2 and 3 made of electronically conductive material and of a membrane 1 with electrodes 4 and 5 applied on both sides. Gas-tightness is made possible by compressing the membrane 1 and end pants 2, 3 with the use of two gaskets 6. In the prior-art cell structure, the end plates 2 and 3 bear with their side facing the membrane 1 down on the latter. This creates an electric contact that allows tapping the voltage. Suitable feed and drain ducts 7 are provided for supplying the fuel. The end plates 2, 3 feature suitable distribution structures 8, 9 for better distribution of the fuels.

Figure 2:
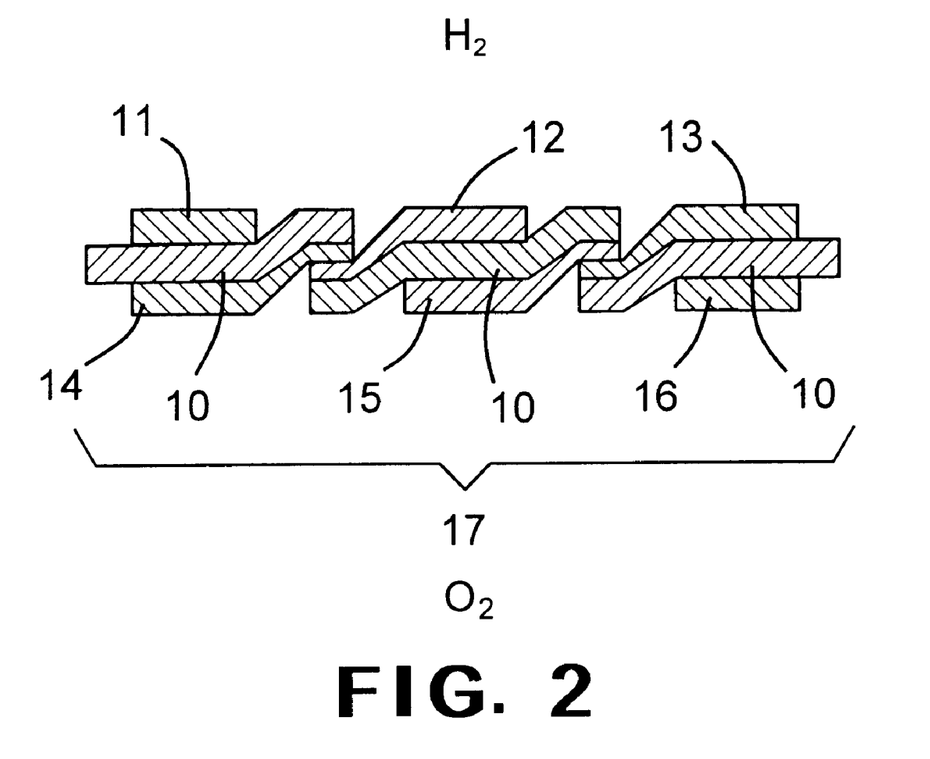
FIG. 2, in vertical section, the structure of an inventional strip membrane of stair-step design.

FIG. 2 shows schematically, in vertical section, the structure of an inventional strip membrane 17 of stair-step arrangement. This inventional strip membrane 17 consists of a plurality of ionically conductive solid polymer membrane regions 10, each side of a membrane region being coated with an electrode structure. In the case of a hydrogen-oxygen fuel cell, hence, each ionically conductive membrane region 10 is coated with a hydrogen electrode 11 through 13 and an oxygen electrode 14 through 16 and thus operates as a fuel-cell unit. Two adjacent membrane regions 10 are now tied together by joining the bottom electrode of the first membrane region (14) to the top electrode (12) of the second membrane region 10 to one another in electronically conductive, gastight and durable manner. Effected thereby is a membrane-internal series connection of all fuel-cell units in the membrane 17, and the total voltage can be tapped at the first electrode of the membrane top side (electrode 11) and at the last electrode of the membrane bottom side (electrode 16). As compared to an individual cell, such strip membrane 17 delivers an output voltage three times as high, since it contains three coated ionically conductive membrane regions. Nonetheless, such strip membrane 17 needs only one fuel supply for the membrane top side (hydrogen) and for the membrane bottom side (oxygen).

This inventional strip membrane, however, is not suited for integration in the prior-art cell structure described above. Namely, if such a strip membrane were installed in a conventional prior-art PEM fuel cell, a short circuit would result due to the electrically conductive end plates. Therefore, the invention proposes a structure according to FIG. 4.

Figure 3:
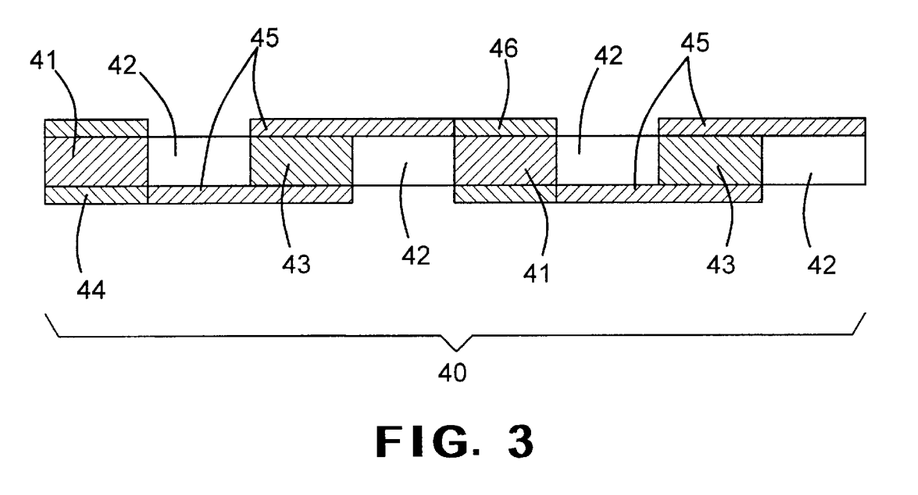
FIG. 3, in vertical section, the structure of an inventional strip membrane.

FIG. 3 now shows, as well in section, a strip membrane 40, with the strip membrane 40 constructed here in the form of successively arranged individual cells 41. The relevant cells 41 are separated from one another by insulation regions 42, with strictly electronically conducting regions 43 being disposed between said regions 42. Decisive in this strip membrane is that the bottom electrode area 44 of the first individual cell 41 is via an electronically conductive coating 45 series-wired to the top electrode area 46 of the next individual cell 41. The periodic repetition of such units, illustrated in section in FIG. 3, forms a strip membrane.

This inventional strip membrane can be assembled as well to a PEM fuel cell using the inventional plates of electronically nonconductive material, as described above already for the stair-step design.

Figure 4:
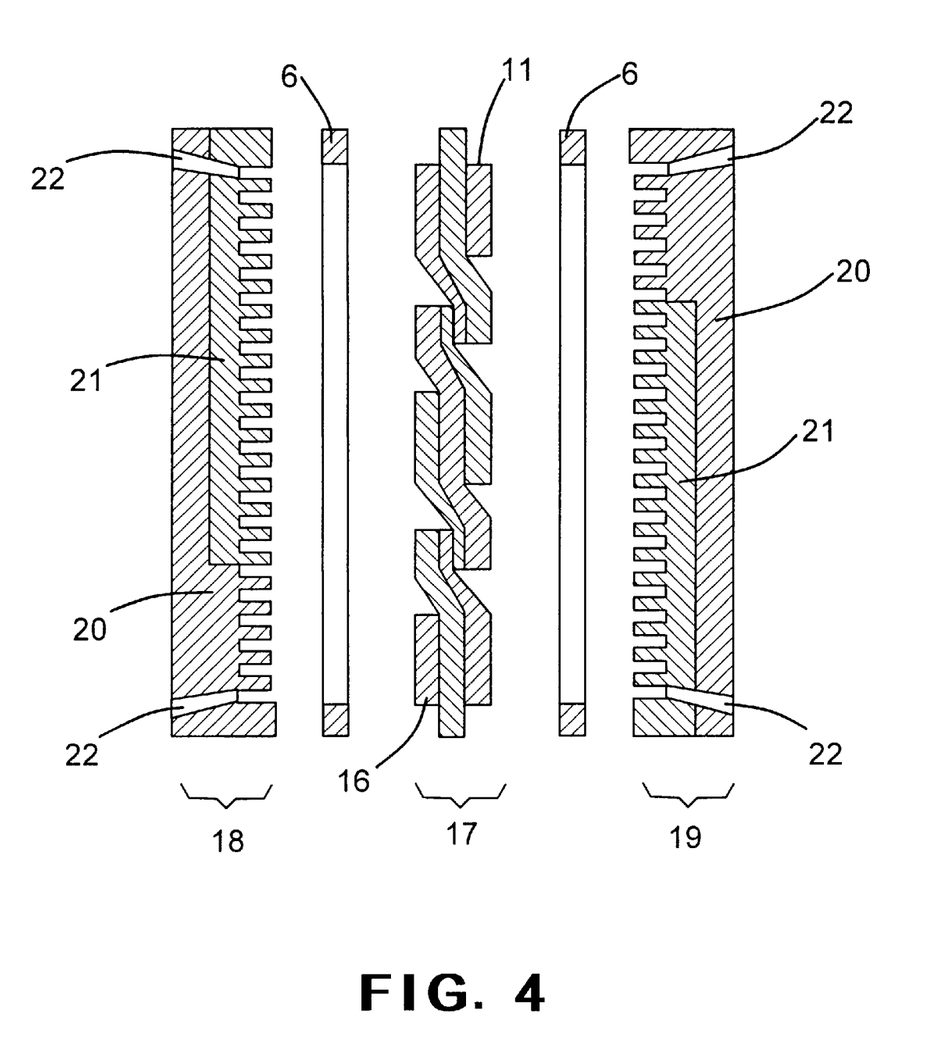
FIG. 4, in vertical section, the major components for constructing an inventional PEM fuel cell.

FIG. 4 shows now, as well schematically in vertical section and comparable to FIG. 1, the major components for constructing an inventional fuel cell. Inventionally proposed is thus the use of a strip membrane, with the required end plates featuring both conductive and nonconductive regions so as to avoid short-circuiting the individual electrode areas of a strip membrane among one another. Consequently, the invention is not limited to the strip membrane according to the embodiment relative to FIG. 2 only, but allows using all strip membranes (e.g., also those relative to FIG. 3) where a series connection of successively arranged individual cells is given. Inventionally significant is thus the combination of strip membranes and specifically structured plates. Essential in the embodiment relative to FIG. 3 is here, i.e., when using merely a one-dimensional strip membrane (electrode arrangement in one direction), that only the first or the last electrode of the strip membrane is in contact with the electronically conductive regions of the end plate while all other electrodes are in contact with the nonconductive plate region.

In the embodiment according to FIG. 4, the structure of the PEM fuel cell is such that two end plates 18 and 19 are provided which together with the membrane unit 17 form the cell. The end plates 18 and 19 have electrically conductive regions 20 and nonconductive regions 21. The arrangement of these regions is such that of the strip membrane 17 only the first electrode 11 has electric contact to the conductive region 20 of the relevant end plates 18, 19 on the one membrane side, or the last electrode 16 on the other membrane side. All other electrodes are in contact only with insulating material. These conductive regions 20 of the end plates then allow tapping the total voltage of the strip membrane cell externally, without any possibility of short-circuiting individual cell units of the strip membrane. As known from the prior art as such already, the structured end plates 18, 19 contain feed or drain channels 22 for the fuels, which with the aid of suitable structures are distributed to all electrodes of a membrane side. Therefore, these structures must be integrated both in the conductive and the nonconductive regions of the end plates so as to safeguard the fuel supply to all electrodes.

The inventionally proposed plates, as illustrated in detail in the specification, may consist either of an electrically conductive element and appropriate nonconductive regions inserted in it, or may consist of a nonconductive element and appropriately inserted conductive regions. Another option is using appropriate elements and providing them then with a coating of conductive or nonconductive material. Essential is in all cases that only an electric bonding of the first or last electrode of one membrane side to the last or first electrode of the other membrane side be effected.

Figure 5:
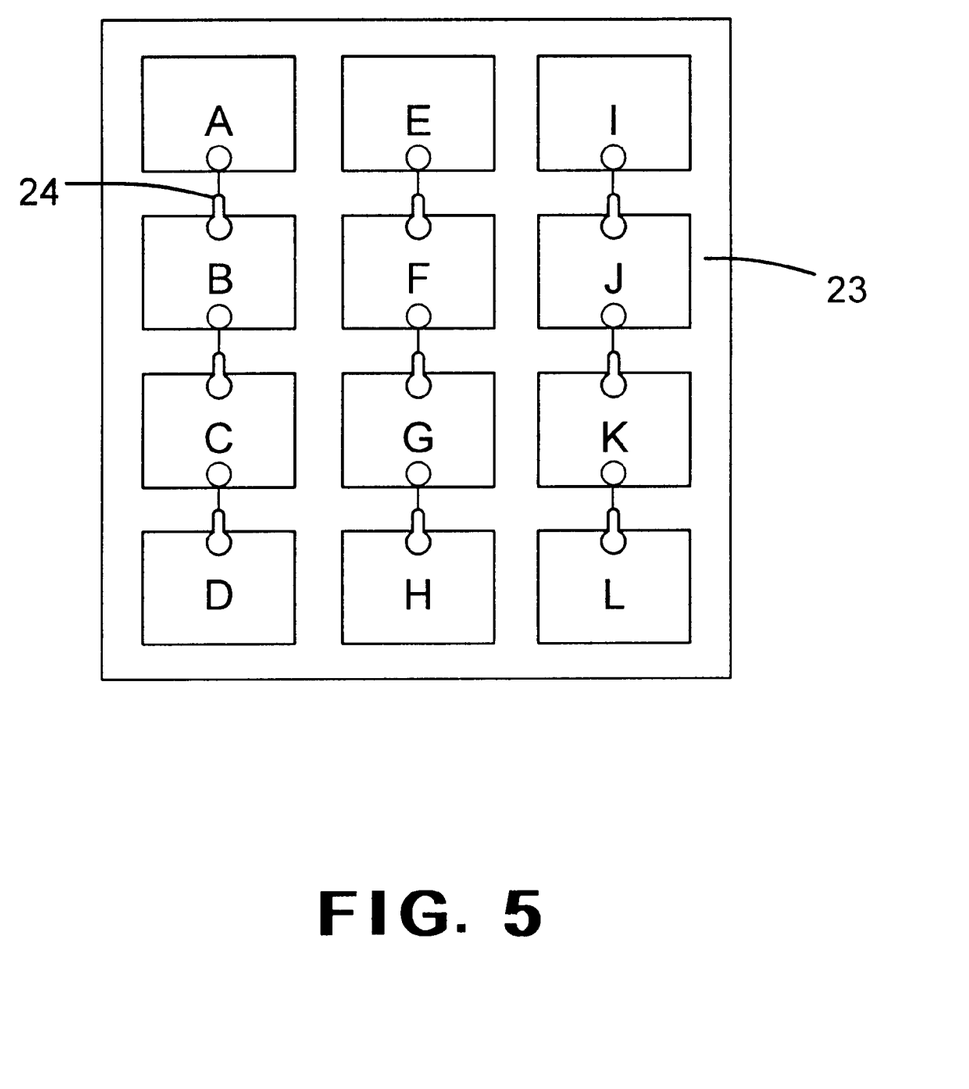
FIG. 5, in plan view, the structure of a two-dimensional strip membrane, with the individual strip membranes arranged for a redundant parallel circuit.

FIG. 5 now shows in plan view schematically the structure of an inventional two-dimensional strip membrane, with a redundant parallel connection being given in the embodiment according to FIG. 5. This membrane consists as well of ionically conductive material 23, with the electrode areas A through L on both electrode sides being disposed side by side both horizontally and vertically. The structure of the membrane according to FIG. 5 is such that three separate series circuits are given on the membrane, and at that, with the cell units A, B, C, D, cell units E, F, G, H, and cell units I, J, K, L being internally series-wired according to the strip membrane principle. This internal series connection is in FIG. 5 schematically illustrated by the symbols 24, with the wiring between the electrode areas, e.g., to be understood such that the top electrode area, e.g., B, is membrane-internally connected, electrically conductively, to the bottom electrode area, for instance, A. Also in this embodiment it is possible to separate the individual cell units by nonconducting insulation regions.

According to the invention, a PEM fuel cell can now be constructed as well in accordance with the embodiment relative to FIG. 4, using now, instead of the one-dimensional strip membrane described there, the two-dimensional strip membrane described above. The inventional end plates according to FIG. 3 allow in this case not only the definitive tapping of the serial voltages, but allow additionally in a simple fashion the further wiring of the individual, separate series circuits on the membrane.

The three separate series circuits according to FIG. 4 are wired in parallel so as to obtain a redundant current supply, since then, with one of the series circuits falling, the others are able to continue working. The embodiment according to FIG. 5 in conjunction with FIG. 4 offers thus, in addition to a still higher output voltage, the advantage that the entire fuel cell is able to continue operating also with one cell unit failing.

Figure 6:
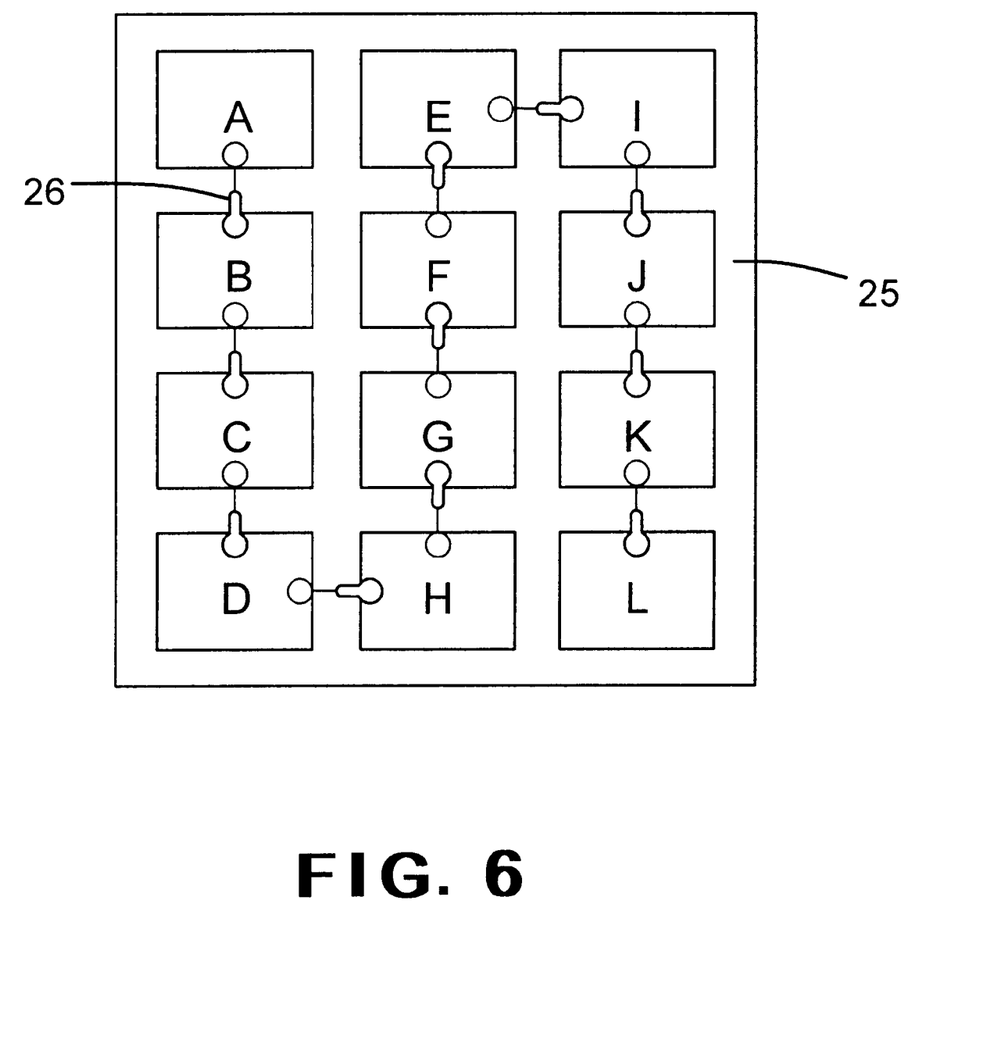
FIG. 6, in plan view, the structure of a two-dimensional strip membrane with the individual strip membranes wired here successively in series.

FIG. 6 shows a further embodiment of a two-dimensional strip membrane, again schematically in plan view. The embodiment relative to FIG. 6 differs from the embodiment reactive to FIG. 5 in that here the individual strip membranes are not connected in parallel by way of the end plates, but that the individual strip membranes are series-connected here among themselves, again via the electrically conducting connections 26. Consequently, this membrane consists as well of an ion-conducting material 25, with all electrode areas A through L on both electrode sides being arranged both horizontally and vertically side by side. All cell units A through L are series-connected here as described above. The total voltage can then be tapped on the top electrode of unit A and on the bottom electrode of unit L. Also in this embodiment it is possible to separate the individual cell units by nonconducting insulation regions. Voltage tapping is effected again with the end plates described above, for example, according to the embodiment relative to FIG. 4.

Figure 7:
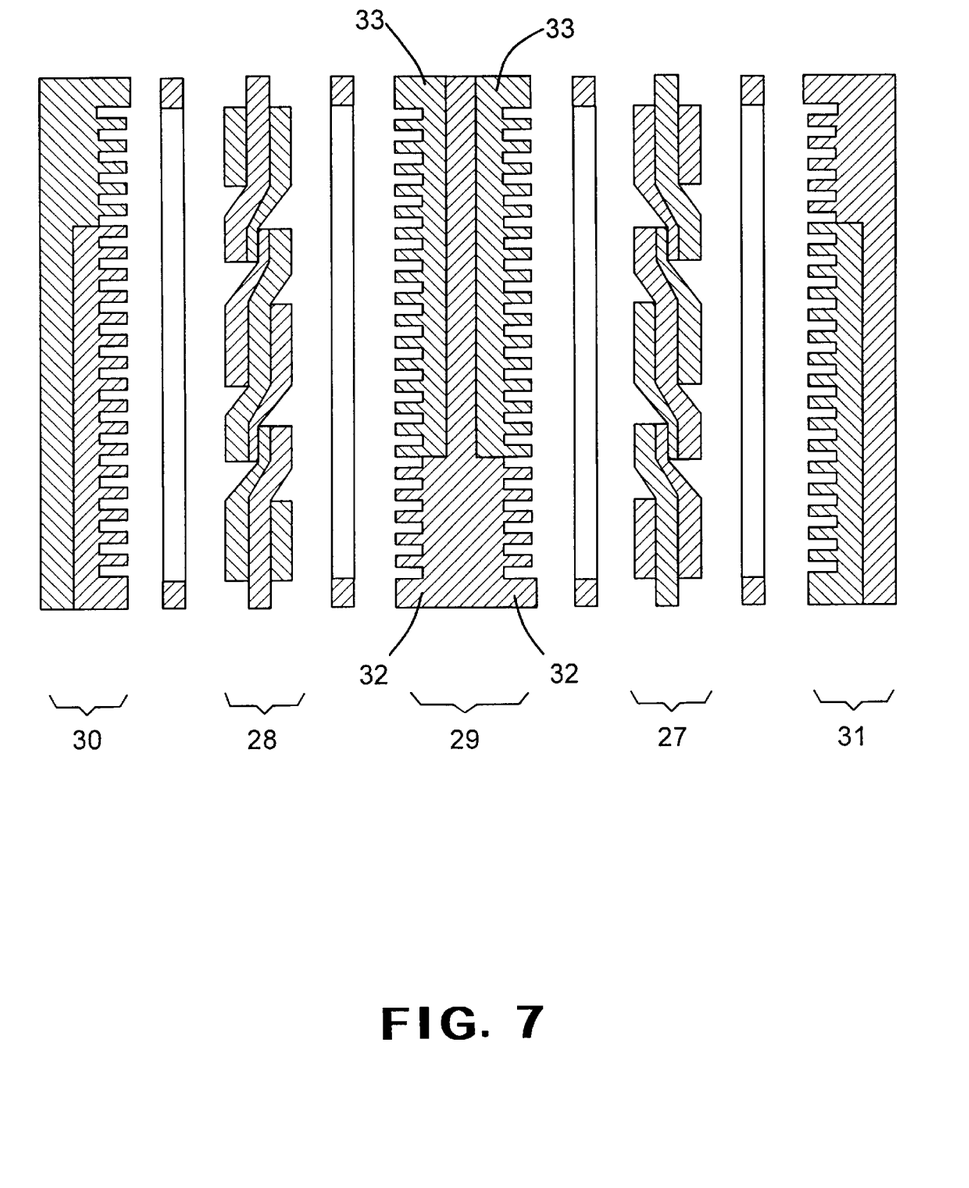
FIG. 7, in vertical section, the major components for structuring an inventional fuel-cell stack.

FIG. 7 shows schematically in vertical section the major components for construction of an inventional PEM fuel cell in stack design.

Employed for that purpose is the inventional strip membrane, instead of the usual, plain membrane electrode units. The embodiment according to FIG. 7 is in exemplary manner composed of two strip membranes 27 and 28, which by means of a bipolar plate 29 and two end plates 30 and 31 can be assembled to form a fuel-cell stack. The strip membranes 27, 28 are joined to each other by means of a structured bipolar plate 29. The total cell voltage is tapped on the structured end plates 30, 31. Essential in the structure of the structured bipolar plate 29 is that it features on both plate sides electrically conductive regions 32 and nonconductive regions 33. The arrangement of the regions is such that of the respective bordering strip membranes 27, 28 only the first or last electrode is in electric contact with the conductive region 32 of the bipolar plate 29. All other electrodes have contact only with insulating material. The conductive regions 32 on both sides of the bipolar plate 29 require electrically conductive connection. The structure of the end plates 30, 31 corresponds already to the described structure of the plain PEM fuel cell in the embodiment relative to FIG. 4.

The structured bipolar plate 29 contains (not illustrated) on both sides again appropriate feed or drain ducts for the fuels, which then are distributed on both plate sides to all of the electrodes of the relevant bordering membrane side by means of suitable structures (for instance, ducts, duct grids or similar). These structures, in turn, must be integrated both in the conductive and nonconductive regions of the bipolar plate 29 in order to safeguard the fuel supply to an of the electrodes.

The structure of both the bipolar plate 29 and the end plates 30, 31 corresponds to that in FIG. 4 and, consequently, may be fabricated both of electrically conducting elements or electrically nonconducting elements.

Analogous to the embodiment relative to FIG. 4, of course, it is in the fuel-cell stack also possible to replace the one-dimensional strip membrane by the two-dimensional strip membrane described in FIGS. 5 and 6. Necessary to that end is only that the respective bipolar plates or end plates be structured accordingly, so as to guarantee both a voltage ring on the end plates and an electrically conductive connection of the individual strip membranes by the bipolar plates.

We claim:

1. A PEM fuel cell, comprising:
   (a) at least one strip membrane with at least two planar individual cells, each individual cell having a polymeric solid electrolyte membrane with a first and a second surface, a first electrode layer disposed on the first surface and a second electrode layer disposed on the second surface, the individual cells being connected in series; and
   (b) fuel supply and fuel removal plates being disposed on each side of the at least one strip membrane for supply and removal of fuel to and from the electrode layers, the fuel supply and fuel removal plates possessing conductive and non-conductive regions, the conductive and non-conductive regions being arranged in the fuel supply and fuel removal plates such that short circuiting between the electrode layers is avoided.

2. The PEM fuel cell according to claim 1, wherein one strip membrane forms a one-dimensional strip membrane and the fuel supply and fuel removal plates act as end plates on each side of the strip membrane, with only the last or the first electrode on every side of the one-dimensional strip membrane being respectively in contact with the conductive region.

3. The PEM fuel cell according to claim 1, wherein 2 to 2,000 strip membranes are arranged parallel with all the polymeric solid electrolyte membranes lying in one plane to form a two-dimensional strip membrane, and the fuel supply and fuel removal plates act as end plates on each side of the two-dimensional strip membrane, with all of the first or all of the last electrodes of one membrane side being respectively in contact with the conductive regions so that a redundant parallel circuit is created.

4. The PEM fuel cell according to claim 1, wherein 2 to 2,000 strip membranes are arranged parallel with all the polymeric solid electrolyte membranes lying in one plane to form a two-dimensional strip membrane, with the individual strip membranes wired in series by separate electrically conductive connections, and in that the plates act as end plates on each side of the two-dimensional strip membrane, with only the first or the last electrode of one membrane side being in contact with the conductive regions.

5. The PEM fuel cell according to claim 1, wherein 2 to 2,000 strip membranes are assembled to a fuel-cell stack, and in that the fuel supply and fuel removal plates act both as intermediate plates between adjacent strip-membranes and also as end plates for a first and a last strip membrane in the fuel-cell stack, with only the first or the last electrode of one membrane side being in contact with the conductive regions.

6. The PEM fuel cell according to claim 1, wherein 2 to 2,000 strip membranes are arranged parallel with all the polymeric solid electrolyte membranes lying in one plane to form a two-dimensional strip membrane, and 2 to 2,000 of these two-dimensional strip membranes are assembled to form a fuel-cell stack, and in that the fuel supply and fuel removal plates act both as intermediate plates between adjacent strip-membranes and as end plates for a first and a last strip membrane in the fuel-cell stack, with all of the first or all of the last electrodes of one membrane side being respectively in contact with the conductive regions, so that a redundant parallel circuit is created for each cell.

7. The PEM fuel cell according to claim 1, wherein 2 to 2,000 strip membranes are arranged parallel with all the polymeric solid electrolyte membranes lying in one plane to form a two-dimensional strip membrane, with the individual strip membranes of a two-dimensional membrane being wired in series among one another by separate electrically conductive connections, and 2 to 2,000 of these two-dimensional membranes are assembled to form a fuel-cell stack, and the fuel supply and fuel removal plates act both as intermediate plates between adjacent strip-membranes and as end plates for a first and a last strip membrane in the fuel-cell stack, with only the first or the last electrode of one membrane side being in contact with the conducting regions.

8. The PEM fuel cell according to claim 1, wherein the fuel supply and fuel removal plates consist of an electrically conductive element in which electrically nonconductive regions are integrated at respective spots of the electrically conductive element.

9. The PEM fuel cell according to claim 8, wherein the nonconductive regions are applied to the electrically conductive element by coating with a nonconductive material.

10. The PEM fuel cell according to claim 1, wherein the fuel supply and fuel removal plates consist of a nonconductive element in which electrically conductive regions are integrated at suitable spots of the nonconductive element.

11. The PEM fuel cell according to claim 10, wherein the conductive regions are applied to the nonconductive element by coating with a conductive material.

12. The PEM fuel cell according to claim 1, wherein a material for the electrically conductive regions of the fuel supply and fuel removal plates is selected from the group consisting of graphite, metals, metal mixtures, alloys and electronically conducting polymers.

13. The PEM fuel cell according to claim 12, wherein the conducting polymers are intrinsically conductive polymers or nonconductive polymers with electrically conductive additives.

14. The PEM fuel cell according to claim 13, wherein the additives are selected from the group consisting of electrically conductive powders, granulates, flakes, fiber shreds, fibers, netting or matting of metals, metal mixtures, alloys, graphite and carbon.

15. The PEM fuel cell according to claim 1, wherein a material for the electrically nonconductive regions is selected from the group consisting of ceramics, oxidic compounds and plastics.

16. The PEM fuel cell according to claim 15, wherein the plastics are polysulfones or polyether ketones.

17. The PEM fuel cell according to claim 1, wherein the fuel supply and fuel removal plates feature fuel distribution structures on the side facing the strip membrane.

18. The PEM fuel cell according to claim 1, wherein the fuel supply and fuel removal plates feature ducts and/or cavities for a coolant flow.

19. The PEM fuel cell according to claim 1, wherein gaskets are arranged between the fuel supply and fuel removal plates and the strip membranes.

20. The PEM fuel cell according to claim 1, wherein the strip membrane consists of individual cells connected in series in a stair-step fashion, such that the first electrode coating of an individual cell partially overlaps with the second electrode coating of another individual cell.

21. The PEM fuel cell according to claim 1, wherein the individual cells are connected in series such that the individual cell's first electrode layer disposed on a first side of the strip membrane is connected via a planar electronically conductive region with the next individual cell's second electrode layer disposed on a second side of the strip membrane.

22. The PEM fuel cell according to claim 21, wherein planar insulation regions are disposed between the planar individual cells and the planar electronically conductive regions.

23. A PEM fuel cell, comprising:
(a) at least one strip membrane with at least two planar individual cells, each individual cell having a polymeric solid electrolyte membrane with a first surface on a first side of the strip membrane and a second surface on a second side of the strip membrane, a first electrode layer disposed on the first surface and a second electrode layer disposed on the second surface, the individual cells being connected in series in a stair-step fashion such that the first electrode layer of an individual cell partially overlaps with the second electrode layer of the next individual cell; and (b) fuel supply and fuel removal plates being disposed on each side of the at least one strip membrane for supply and removal of fuel to and from the electrode layers, the fuel supply and fuel removal plates possessing conductive and non-conductive regions, the conductive and non-conductive regions being arranged in the fuel supply and fuel removal plates such that short circuiting between the electrode layers is avoided.

24. A PEM fuel cell, comprising:

(a) at least one strip membrane with at least two planar individual cells, each individual cell having a polymeric solid electrolyte membrane with a first and a second surface, a first electrode layer disposed on the first surface and a second electrode layer disposed on the second surface, the individual cells being connected in series; and (b) fuel supply and fuel removal plates being disposed on each side of the at least one strip membrane, the fuel supply and fuel removal plates possessing conductive and non-conductive regions, the conductive and non-conductive regions having means for supplying the electrode layers with fuel, the conductive and non-conductive regions being arranged in the fuel supply and fuel removal plates such that short circuiting between the electrode layers is avoided.

* * * * *

UNITED STATES PATENT AND TRADEMARK OFFICE
CERTIFICATE OF CORRECTION

PATENT NO : 5,952,118
DATED : September 14, 1999
INVENTOR(S): Konstantin Ledjeff and Roland Nolte It is certified that error appears in the above-identified patent and that said Letters Patent is hereby corrected as shown below:

Cover page, column 1, line 7, under [73] Assignee,
   after "Angewandten", insert --Forschung e.V.--

Signed and Sealed this

Twentieth Day of June, 2000

Attest:

Q. TODD DICKINSON

*Attesting Officer*            *Director of Patents and Trademarks*